Figure 1:
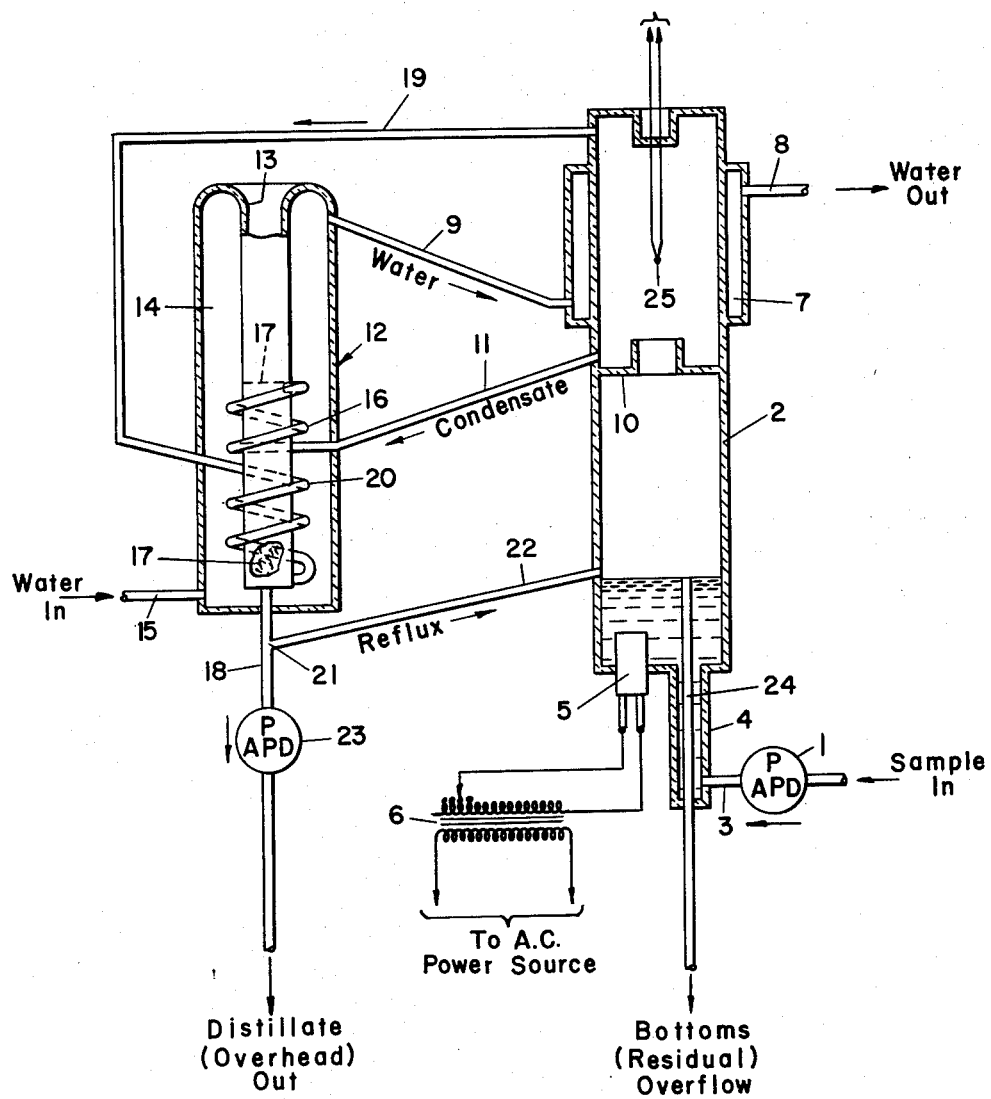

Aug. 31, 1965     C. K. DONNELL     3,203,227
LIQUID STREAM BOILING POINT ANALYZER
Filed May 24, 1962     2 Sheets-Sheet 1

INVENTOR:
CONARD K. DONNELL
BY
ATTORNEY

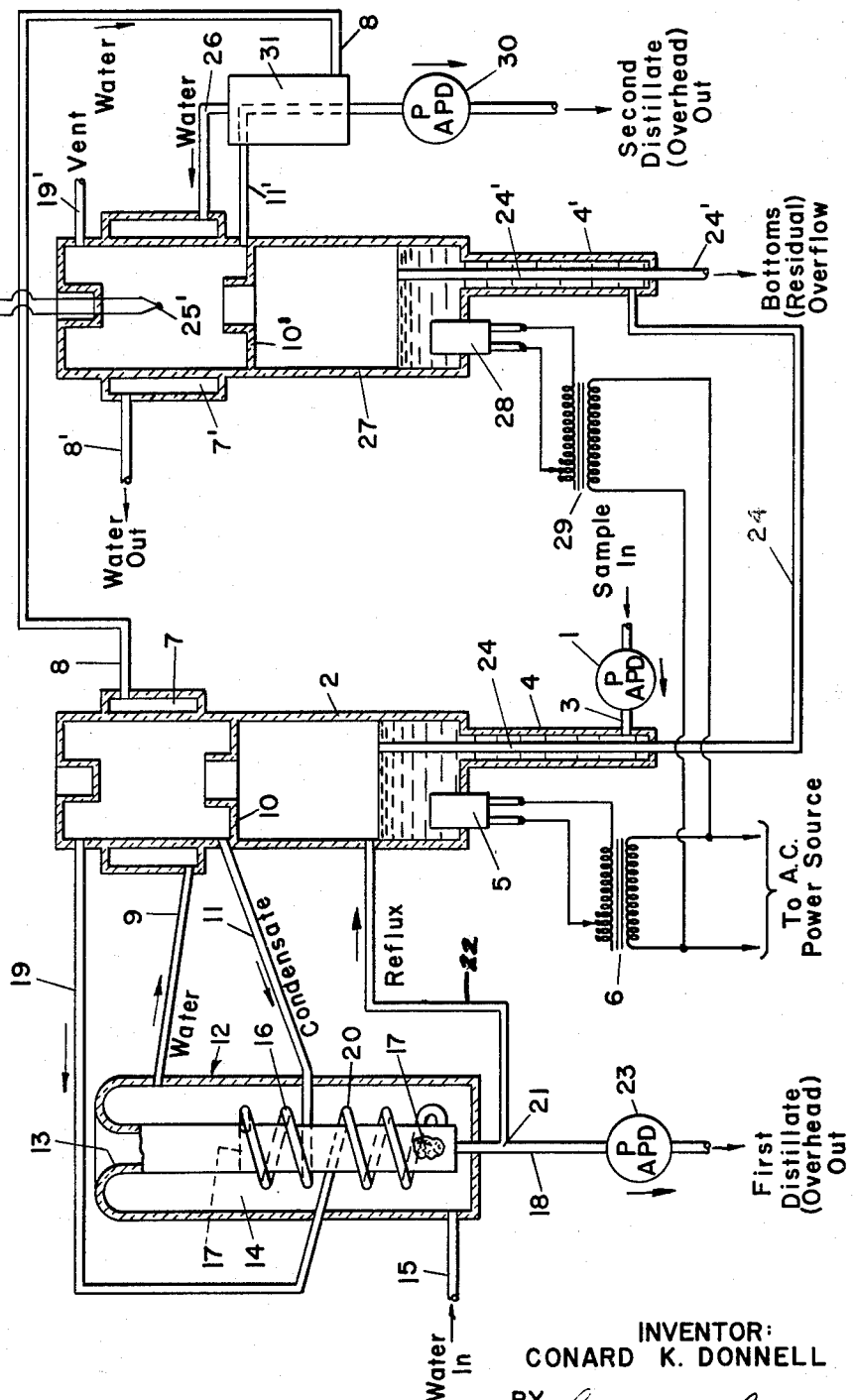

United States Patent Office 3,203,227
Patented Aug. 31, 1965

3,203,227
LIQUID STREAM BOILING POINT ANALYZER
Conard K. Donnell, Springfield, Pa., assignor to Sun Oil Company, Philadelphia, Pa., a corporation of New Jersey
Filed May 24, 1962, Ser. No. 197,396
20 Claims. (Cl. 73—17)

This invention relates to apparatus for analyzing a liquid stream, and more particularly to apparatus for continuously determining the boiling point of a hydrocarbon stream.

This invention constitutes an improvement over that disclosed in the copending Luther application, Serial No. 170,582, filed February 1, 1962, which ripened on February 4, 1964, into Patent No. 3,120,119.

The aforementioned application discloses two separate, but related, types of analyzing apparatus for measuring, in a continuous manner, the 50% and the 90% boiling points, respectively, of a hydrocarbon stream. Each of these two types of apparatus includes at least one heated distillation vessel to which sample is continuously fed at a known rate, and from which condensate (distillate) is removed at a known rate which is a fixed fraction of the sample feed rate. When using an apparatus of the type described, it is essential, and in fact necessary, to condense substantially all the vapors that are produced in the heated vessel or "pot"; any appreciable loss of such vapors to the atmosphere causes the vapor temperature measured in the analyzer to differ (to an undesirable extent) from the actual or correct boiling point of the sample.

An object of this invention is to provide novel apparatus for determining a preselected boiling point of a liquid stream, in a continuous manner.

Another object is to provide, in liquid stream analyzing apparatus, an arrangement for collecting substantially all of the low-boiling materials, i.e., the "light ends," contained in the stream.

A further object is to provide a novel condenser-absorber arrangement for collecting low-boiling material from a hydrocarbon sample, using ordinary tap water.

The foregoing and other objects of the invention are accomplished, briefly, in the following manner. A stream of sample to be analyzed is continuously fed, at a known and constant rate, into a heated distillation vessel or "pot," operating as a flash evaporator. The higher-boiling components of the sample are condensed as liquid by means of a condenser, and are fed to a condenser-absorber. The uncondensed lower-boiling components (i.e., the so-called "light ends") are led off as vapors to the condenser-absorber. In the condenser-absorber, the vapors are brought into contact with the liquid condensate, causing absorption of the vapors by the liquid to take place. In addition, condensation may take place, because the condenser-absorber is a water-cooled device. The liquid effluent from the condenser-absorber, which liquid includes the absorbed and condensed "light ends," is coupled to the suction side of a pump. This pump continuously extracts liquid from the condenser-absorber at a known and constant rate which is a (predetermined) fixed fraction of the feed rate to the pot, and any liquid not taken by the pump is refluxed back into the pot, at a point above the bottom thereof. An overflow or effluent pipe drains off excess liquid (bottoms) which tends to accumulate in the pot.

In a modification, two heated vessels are used, with the effluent (overflow) from the first vessel or still constituting the feed for the second still. Condensate or distillate is removed from the second still at a known and constant rate which bears a predetermined relation to the feed rate to the first still. In this case, the final bottoms product overflows from the second still.

A detailed description of the invention follows, taken in conjunction with the accompanying drawings, wherein:

FIG. 1 is a view, partly schematic, of one form or embodiment of apparatus according to the invention; and FIG. 2 is a view similar to FIG. 1 but showing another form or embodiment of apparatus according to the invention.

Referring first to FIG. 1, a sample of the liquid hydrocarbon stream to be analyzed is continuously pumped or fed at a constant, predetermined feed rate by an adjustable positive displacement pump 1 (which may be a so-called "diaphragm pump") into a heated distillation vessel or pot 2, by way of a conduit 3 opening into a tubular member 4 which extends downwardly from the base of the vessel 2 and which communicates at its upper end with the interior of the vessel.

The vessel 2 is heated by a cartridge-type immersion heater 5, so that this vessel operates as a flash evaporator. Heater 5 is supplied with electric current by means of a variable transformer 6 (illustrated, for example, as having a tapped secondary winding) whose primary winding is connected to a suitable source of power, such as an alternating current power line. The heat input to the still 2 may be adjusted, manually, by the variable transformer 6. The adjustment of this heat will be again referred to, hereinafter.

Adjacent its upper end, vessel 2 is provided with a surrounding jacket 7 through which cooling water is circulated by means of the pipes 8 and 9 coupled to the upper and lower ends, respectively, of jacket 7. This provides a condenser, at the upper end of vessel 2. At least a portion of the vapors produced in vessel 2 are condensed by the action of the condenser just described, and the liquid condensate flows downwardly from the condenser along the inner wall of vessel 2. This condensate (which is of course a portion of the distillate produced by vaporization of the liquid sample, in vessel 2) collects in an annular tray 10 (sealed around its periphery to the inner wall of vessel 2) which is located somewhat below the lower end of jacket 7. The tray 10, being annular, allows passage of vapor upwardly from the bottom of vessel 2 to the top thereof, through the central hole in this tray.

A tube or conduit 11 is coupled at its upper end to tray 10, to cause gravity flow of the liquid collecting in tray 10 downwardly, out of vessel 2, to a condenser-absorber denoted generally by numeral 12. The condenser-absorber 12 includes a tube 13 surrounded by a jacket 14 through which cooling water is circulated by means of the pipes 9 and 15 coupled to the upper and lower ends, respectively, of jacket 14. Pipe 15 feeds ordinary tap water into jacket 14, and the water flows out of jacket 14 by way of pipe 9 and thence into and through jacket 7, and out of jacket 7 by way of pipe 8, which goes to a drain.

The lower end of tube 11 is sealed into jacket 14 and is joined to the lower end of a helically-coiled tube 16 which is positioned in jacket 14 and which surrounds but is spaced from tube 13. The upper end of the coiled tube 16 is sealed into tube 13, at a point below the horizontal level of the bottom of tray 10. Thus, the liquid collecting in tray 10 can flow by gravity through conduit 11 and coiled tube 16 into the interior of tube or column 13, at an intermediate point thereof. The liquid condensate is cooled as it flows through coiled tube 16, since this tube is positioned within the water jacket 14.

The interior of tube 13 is filled with packing 17, from a level just slightly above the upper end of coiled tube 16 to the lower end of tube 13. This packing may be of the fibrous metal type commonly used for packing fractionation towers.

The liquid condensate which first collects at tray 10 is caused to issue from the open upper end of coiled tube 16 (which upper end opens into tube 13) and to flow downwardly over and through the packing in the packed column 13. Further cooling of this liquid takes place as it flows downwardly through tube 13, since the latter is surrounded by water jacket 14.

The upper end of tube 13 is open to the atmosphere, while the lower end is joined to the upper end of a flow pipe 18, which latter is sealed through the outer wall of jacket 14.

The vapors produced in vessel 2 which are not condensed by the condenser utilizing jacket 7 (which uncondensed vapors include the lower-boiling constituents or components of the liquid sample, that is, the "light ends") are led off, as vapor, from the upper end of vessel 2 by means of a tube 19 one end of which is coupled to vessel 2, above jacket 7. The other end of tube 19 is sealed into jacket 14 of condenser-absorber 12, at a point somewhat below the point of entry of tube 11 into this same jacket. Within jacket 14, the end of tube 19 is joined to the upper end of a helically-coiled tube 20 which is positioned in jacket 14 and which surrounds but is spaced from tube 13. The lower end of the coiled tube 20 is sealed into tube 13 at the bottom thereof, that is, adjacent the junction of flow pipe 18 and tube 13. Thus, the vapors emanating from the top of vessel 2 travel through tube 19 and coiled tube 20 into the interior of tube or column 13, at the bottom end thereof. The vapors are cooled as they flow through coiled tube 20, since this tube is positioned within the water jacket 14.

Countercurrent flow is established in the packed column 13, with the cooled (liquid) condensate flowing downwardly and the vapors passing upwardly. Ample liquid-vapor contact is brought about due to the packing 17, which in effect "spreads out" the liquid, to give a very large surface contact area. As the liquid passes downwardly, with the vapors passing upwardly, the liquid absorbs or dissolves the vapors, causing the "light ends" of the sample to be carried down to the bottom of tube 13 with the liquid, to become liquid effluent from the unit 12. In addition to the absorption or dissolution action described, condensation effects may take place, since the vapors are water-cooled as they pass through coiled tube 20 (which is in jacket 14) and also as they pass through tube 13 (which is surrounded by jacket 14). Even if no actual condensation effects occur, the cooling (in unit 12) previously described is important since the lower the temperatures of the liquid and of the vapors, the more efficient will be the absorption action.

The net result of the action or actions taking place in the packed column 13 is that substantially all of the vapors passing through tube 19 are made to appear in the liquid effluent from the condenser-absorber 12 (which effluent flows into the upper end of flow pipe 18), and only a minuscule amount (if any at all) of vapor passes out of the apparatus to the atmosphere by way of the open upper end of tube 13. Thus, substantially all of the "light ends" or low-boiling components contained in the sample stream are collected by the condenser-absorber 12.

The liquid effluent from the condenser-absorber 12 (or, in other words, the distillate from still 2) flows from the bottom end of column 13 down flow pipe 18 to a T-junction 21, from whence it can flow along one or both of two separate paths. If there is sufficient distillate available at junction 21 (that is, if a column of liquid distillate extends sufficiently above this junction), it can flow by gravity through an upwardly-inclined short tube 22 back into vessel 2 as reflux; one end of tube 22 is coupled to junction 21 and its other end opens into vessel 2, above the bottom of the latter, but considerably below tray 10.

The other of the two paths referred to comprises a continuation of pipe 18, the lower end of which is connected to the suction or intake of a pump 23. Pump 23, like pump 1, is an adjustable positive displacement pump ("diaphragm pump"). Such pumps are commercially available and can be adjusted to operate at preselected or predetermined (and constant) rates. They operate in effect as metering pumps, whose metering rates are known and constant. Pump 23, fed through tube 18, operates to continuously pump still overhead (distillate) out of unit 12 at a constant, predetermined rate. The rate at which pump 23 operates has a certain relation to the rate at which pump 1 operates. More specifically, the ratio of the rates of pumps 23 and 1 (expressed in percent) is equal to the particular boiling point (of the sample) which is to be determined. For example, if the apparatus of FIG. 1 is a "50% boiling point analyzer," the pump 23 would operate at a rate which is 50% of the rate of pump 1 (i.e., the feed rate).

Material not taken overhead (by pump 23) is removed from the pot 2 through a bottoms overflow line 24 whose upper end opens into vessel 2 at a point above the level of the top of the cartridge-heater well, and somewhat below the point at which tube 22 opens into vessel 2. Line 24 is of smaller diameter than tubular member 4 and is mounted concentrically of this latter member. Line 24 is sealed through the bottom end of member 4 and extends to a suitable drain; this line thus carries the bottoms or residual overflow from pot 2. Line 24 serves as an overflow conduit connected to vessel 2 for draining off excess liquid which tends to accumulate therein; this line is arranged to prevent the liquid in still 2 from rising above a predetermined level, which level is that of the upper end of line 24.

The line 24 within the tubular member 4 provides a heat exchange arrangement, in which hot liquid from the pot 2 (flowing downwardly through line 24) gives up heat to the cooler liquid (sample or feed) flowing upwardly in member 4.

A thermocouple 25 is inserted into the vessel 2, from the upper end thereof. This thermocouple serves as a means whereby the vapor temperature in the distillation apparatus (i.e., the temperature of the vapors produced in vessel or pot 2) may be measured. The vapor temperature is continuously measured, and is recorded by means of a recording potentiometer of conventional type (not shown) which is connected to, and responds to, the thermocouple 25.

The heat input to heater 5 is adjusted manually (by means of the variable transformer 6) to obtain a substantial reflux rate; this means a substantial flow of distillate up tube 22 and into vessel 2. Since the total rate of distillate production is equal to the sum of the rate of pump 23 and the rate of reflux, and since sufficient heat is supplied to pot 2 to obtain a substantial reflux rate when pump 23 is operating, it may be seen that the intake of pump 23 will never run dry.

Once the pump rate (of pump 23) has been set or adjusted to the particular boiling point selected (for example, the 50% point), and the stillpot heat input has been adjusted manually as described, continuous analysis of the liquid stream is effected by measuring (and recording) the vapor temperature, as sensed by thermocouple 25. The measured vapor temperature changes automatically, in response to changes in the 50% boiling point (or any other preselected boiling point) of the product (sample) stream, without any further manual adjustment of variable transformer 6 or of the heat supplied to pot 2. Any predetermined or preselected boiling point may be chosen for control or analysis, by proper correlated adjustment of the rates of pumps 1 and 23.

Ordinarily, the analyzer of FIG. 1 boils the sample (with the analyzer operating as a continuous flash evaporator) at constant heat input, once the heat input has been adjusted to obtain a substantial reflux, as previously described. However, if desired, automatic reflux control of pot heat input, or automatic distillate level control of pot heat input, may be applied to the device, using the principles disclosed in the aforementioned application.

FIG. 2 illustrates another embodiment of the invention, particularly useful for recording boiling points above approximately 70%. By way of example, it will be described as a "90% boiling point analyzer," i.e., an analyzer which continuously measures and records the 90% point of a hydrocarbon stream. In this figure, elements the same as those of FIG. 1 are denoted by the same reference numerals, while analogous elements are denoted by the same reference numerals, but primed.

In FIG. 2, the bottoms overflow line 24, instead of going to a drain after passing through the bottom end of member 4 as in FIG. 1, extends sideways a little distance to open into a tubular member 4' which extends downwardly from the base of a second heated distillation vessel 27 and which communicates at its upper end with the interior of vessel 27. Vessel or still 27 may be considered as the second stage of the analyzer. Since the FIG. 2 embodiment employs two stages, the bottoms from the first stage 2 may be termed intermediate bottoms. By means of line 24 and tubular member 4', intermediate bottoms (effluent) from the first stage vessel 2 flows by gravity to the second stage vessel 27. In other words, the bottoms overflow from the first vessel 2 is utilized as the (gravity) feed for the second vessel 27. Thus, it may be seen that the rate of feed to the second stage 27 is equal to the difference between the feed rate to the first stage (rate of pump 1) and the distillate or overhead extraction rate of the first stage (rate of pump 23).

The vessel 27 is heated by a cartridge-type immersion heater 28, so that this vessel operates as a flash evaporator. Thus, the analyzer of FIG. 2 is a two-stage flash evaporator. Heater 28 is supplied with electric current by means of a variable transformer 29 (illustrated, for example, as having a tapped secondary winding) whose primary winding is connected to a suitable source of power, such as an alternating current power line. The heat input to the still 27 may be adjusted, manually, by the variable transformer 29.

One end of a tube 19' is coupled to the upper end of vessel 27, the other end of this tube being open to provide an atmospheric vent.

Just below tube 19', vessel 27 is provided with a surrounding jacket 7' through which cooling water is circulated, in a manner to be described hereinafter, to provide a condenser. The vapors produced in vessel 27 are condensed by the action of the condenser just described, the liquid condensate flowing downwardly along the inner wall of vessel 27 and collecting in the annular tray 10'.

The liquid collecting in tray 10' flows by gravity through tube or conduit 11' to the intake or suction of an adjustable positive displacement pump ("diaphragm pump") 30. Prior to reaching the pump 30, however, the conduit 11' passes through a jacket 31 through which cooling water is circulated by means of the pipes 8 and 26 coupled to the lower and upper ends, respectively, of jacket 31. Water jacket 31 provides a distillate cooler, which functions to reduce the temperature of the second-stage distillate prior to its application to the pump 30. The cooler aforesaid operates to prevent partial vaporization of the hot distillate possibly causing vapor-locking of the distillate pump resulting in a lower than normal liquid pumping rate.

The pipe 26 extends from the upper end of jacket 31 to the lower end of jacket 7', while the pipe 8' coupled to the upper end of jacket 7' goes to a drain. In FIG. 2, pipe 8 does not go to a drain, as it does in FIG. 1, but instead it extends from the upper end of jacket 7 to the lower end of jacket 31. Pipe 15 then feeds ordinary tap water into jacket 14, and the water flows through jacket 14, pipe 9, jacket 7, pipe 8, jacket 31, pipe 26, jacket 7', and pipe 8' to the drain.

Pump 30, like pumps 23 and 1, is an adjustable positive displacement pump. Pump 30, fed through tube 11', operates to continuously pump still overhead (distillate) from tray 10' (and out of vessel 27) at a constant, predetermined rate.

Material not taken overhead by pump 30, which material is the bottoms of the second stage (or final bottoms), is removed from the vessel 27 through a bottoms overflow line 24' whose upper end opens into vessel 27 at a point above the level of the top of the cartridge-heater well and of course below tray 10'. Line 24' is of smaller diameter than tubular member 4' and is mounted concentrically of this latter member. Line 24' is sealed through the bottom end of member 4' and extends to a suitable drain; this line thus carries the bottoms or residual overflow from pot 27. Line 24' serves as an overflow conduit connected to vessel 27 for draining off excess liquid which tends to accumulate therein; this line is arranged to prevent the liquid in still 27 from rising above a predetermined level, which level is that of the upper end of line 24'.

The line 24' within the tubular member 4' provides a heat exchange arrangement, in which hot liquid from the pot 27 (flowing downwardly through line 24') gives up heat to the cooler liquid from pot 2 (since pot 2 ordinarily operates at a lower temperature than pot 27) flowing upwardly in member 4'.

In FIG. 2, the thermocouple 25' is inserted into the vessel 27, from the upper end thereof. This thermocouple serves as a means whereby the vapor temperature in the distillation apparatus (i.e., the temperature of the vapors produced in vessel or pot 27) may be measured. The vapor temperature is continuously measured, and is recorded by means of a recording potentiometer of conventional type (not shown) which is connected to, and responds to, the thermocouple 25'.

In FIG. 2, the heat input to each of the two stages 2 and 27 may be independently adjusted, manually, by the respective variable transformers 6 and 29. The heat input to both vessels 2 and 27 should be adjusted to provide a substantial reflux to both vessels. In the case of vessel 27, reflux is effected by the tray 10' filling up and "spilling over" its radially-inner cylindrical lip and down through its central opening into the lower part of the pot. So long as there is sufficient distillate available to provide substantial reflux in the respective vessels, the pumps 23 and 30 will never run dry.

In FIG. 2, the distillate pumps 23 and 30 are adjusted at a fixed ratio to permit 10% of the feed to overflow at 24' from the second stage 27. In other words, the sum of the absolute rates of these two pumps should equal 90% of the rate of feed pump 1. (Criteria for adjusting these rates are set out in detail in the aforementioned application.) Temperature of the vapor produced in the second stage pot 27 can be correlated with the ASTM (American Society for Testing Materials) 90% point. Once the pump rates have been set or adjusted as described, and the stillpot heat inputs have been adjusted manually as described, continuous analysis of the liquid stream is effected by measuring (and recording) the vapor temperature, as sensed by thermocouple 25'. The measured vapor temperature changes automatically, in response to changes in the 90% point of the product (sample) stream, without any further manual adjustments of variable transformers 6 and 29 or of the heat supplied to pots 2 and 27.

The analyzer of FIG. 2 ordinarily operates as a two-stage flash evaporator, boiling the sample at constant heat input. However, if desired, automatic control of pot heat input may be utilized, as previously described in connection with FIG. 1.

The invention claimed is:
1. In apparatus for analyzing a stream of liquid, distillation means including a heated distillation vessel for vaporizing at least a portion of the liquid fed thereto and a condenser for condensing only a portion of the vapors produced in said vessel; means for feeding at a first predetermined rate to said vessel the liquid stream to be analyzed, means for receiving uncondensed vapors and also condensate from said condenser, said last-mentioned means operating to collect and thereby to cause to be retained in the apparatus substantially all of the uncondensed vapors derived from low-boiling materials contained in said stream, the collected and retained low-boiling materials and condensate produced by said condenser forming a liquid distillate; means coupled to said last-mentioned means for removing liquid distillate from the apparatus at a second rate which is made to be a preselected fraction including unity of said first rate, and means for measuring the temperature of the vapors produced in said vessel.

2. Combination as defined in claim 1, wherein said collecting means comprises a condenser-absorber unit which receives the uncondensed low-boiling materials and also said condensate.

3. Combination as defined in claim 1, wherein said collecting means comprises a liquid-vapor contact device in which the vaporized low-boiling materials are brought into contact with liquid condensate produced by said condenser.

4. In apparatus for analyzing a stream of liquid, distillation means including a heated distillation vessel for vaporizing at least a portion of the liquid fed thereto and a condenser for condensing a portion of the vapors produced in said vessel; means for feeding at a first predetermined rate to said vessel the liquid stream to be analyzed, means coupled to said vessel for collecting and thereby causing to be retained in the apparatus substantially all of the low-boiling materials contained in said stream, said last-mentioned means comprising a packed column and means for causing countercurrent flows therein of the vaporized low-boiling materials and of liquid condensate produced by said condenser; means coupled to said packed column for removing liquid from the apparatus at a second rate which is made to be a preselected fraction including unity of said first rate, and means for measuring the temperature of the vapors produced in said vessel.

5. In apparatus for analyzing a stream of liquid, distillation means including a heated distillation vessel for vaporizing at least a portion of the liquid fed thereto and a condenser for condensing only a portion of the vapors produced in said vessel; means for feeding at a first predetermined rate to said vessel the liquid stream to be analyzed, means for receiving the uncondensed vapors produced in said vessel and for converting such vapors to liquid, thereby to form, with condensate produced by said condenser, a liquid distillate; means coupled to said last-mentioned means for removing liquid distillate from the apparatus at a second rate which is made to be a preselected fraction including unity of said first rate, and means for measuring the temperature of the vapors produced in said vessel.

6. In apparatus for analyzing a stream of liquid, distillation means including a heated distillation vessel for vaporizing at least a portion of the liquid fed thereto and a condenser for condensing a portion of the vapors produced in said vessel; means for feeding at a first predetermined rate to said vessel the liquid stream to be analyzed, means for abstracting vapors from said vessel and for integrating the same with liquid condensate produced by said condenser to provide a liquid distillate, means coupled to said last-mentioned means for removing liquid distillate from the apparatus at a second rate which is made to be a preselected fraction including unity of said first rate, and means for measuring the temperature of the vapors produced in said vessel.

7. Combination as defined in claim 6, wherein said abstracting and integrating means comprises a condenser-absorber unit to which are fed the vapors abstracted from said vessel and also said condensate.

8. Combination as defined in claim 6, wherein said abstracting and integrating means comprises a liquid-vapor contact device in which the abstracted vapors are brought into contact with said liquid condensate.

9. Combination as defined in claim 6, wherein said abstracting and integrating means comprises a packed column, and means for causing countercurrent flows, in said column, of the abstracted vapors and of said liquid condensate.

10. Apparatus for continuously analyzing a stream of liquid, comprising a heated still with a condenser coupled thereto; means for continuously feeding at a first predetermined rate to said still the liquid stream to be analyzed, means for receiving uncondensed vapors and also condensate from said condenser, said last-mentioned means operating to collect and thereby to cause to be retained in the apparatus substantially all of the uncondensed vapors derived from low-boiling materials contained in said stream, the collected and retained low-boiling materials and condensate produced by said condenser forming a liquid distillate; means coupled to said last-mentioned means for continuously removing liquid distillate from said apparatus at a second rate which is made to be a preselected fraction of said first rate, means coupled to said still for draining off excess liquid which tends to accumulate therein, and means for continuously measuring the temperature of the vapors produced in said still.

11. Apparatus as defined in claim 10, wherein said collecting means comprises a condenser-absorber unit which receives the uncondensed low-boiling materials and also said condensate.

12. Apparatus as defined in claim 10, wherein said collecting means comprises a liquid-vapor contact device in which the vaporized low-boiling materials are brought into contact with liquid condensate produced by said condenser.

13. Apparatus for continuously analyzing a stream of liquid, comprising a heated still with a condenser coupled thereto; means for continuously feeding at a first predetermined rate to said still the liquid stream to be analyzed, means coupled to said still for collecting and thereby causing to be retained in the apparatus substantially all of the low-boiling materials contained in said stream, said last-mentioned means comprising a packed column and means for causing countercurrent flows therein of the vaporized low-boiling materials and of liquid condensate produced by said condenser; means coupled to said packed column for continuously removing liquid from the apparatus at a second rate which is made to be a preselected fraction of said first rate, means coupled to said still for draining off excess liquid which tends to accumulate therein, and means for continuously measuring the temperature of the vapors produced in said still.

14. Apparatus for analyzing a stream of liquid, comprising a heated still for vaporizing at least a portion of the liquid fed thereto, a condenser at one end of said still for condensing a portion of the vapors produced in said still, means for feeding at a first predetermined rate to said still the liquid stream to be analyzed, a condenser-absorber, means for gathering liquid condensate produced by said condenser and for feeding such condensate to said condenser-absorber, means for conveying vapors from said still to said condenser-absorber, to therein come into contact with said liquid condensate, means for extracting liquid from said condenser-absorber at a second rate which is made to be a preselected fraction of said first rate, and means for measuring the temperature of the vapors produced in said still.

15. Apparatus for analyzing a stream of liquid, comprising a heated still for vaporizing at least a portion of the liquid fed thereto, a condenser at one end of said still for condensing a portion of the vapors produced in said still, means for feeding at a first predetermined rate to said still the liquid stream to be analyzed, a packed column, means for feeding liquid condensate produced by said condenser into said column, means for feeding vapors produced in said still into said column, to therein come into contact with said liquid condensate, means for extracting liquid from said column at a second rate which is made to be a preselected fraction of said first rate, and means for measuring the temperature of the vapors produced in said still.

16. Apparatus for continuously analyzing a stream of liquid, comprising a heated still for vaporizing at least a portion of the liquid fed thereto, a condenser at one end of said still for condensing a portion of the vapors produced in said still, means for continuously feeding at a first predetermined rate to said still the liquid stream to be analyzed, a condenser-absorber, means for gathering liquid condensate produced by said condenser and for feeding such condensate to said condenser-absorber, means for abstracting vapors from said still and for feeding such vapors to said condenser-absorber, to therein come into contact with said liquid condensate, means for continuously extracting liquid from said condenser-absorber at a second rate which is made to be a preselected fraction of said first rate, means coupled to said still for draining off excess liquid which tends to accumulate therein, and means for continuously measuring the temperature of the vapors produced in said still.

17. Apparatus for analyzing a stream of liquid, comprising a heated still for vaporizing at least a portion of the liquid fed thereto, a condenser at one end of said still for condensing a portion of the vapors produced in said still, means for feeding at a first predetermined rate to said still the liquid stream to be analyzed, a packed column, means for feeding liquid condensate produced by said condenser into said column so that said condensate flows in one direction through said column, means for feeding vapors produced in said still into said column so that said vapors tend to pass through said column in a direction opposite to said one direction, means for extracting liquid from said column at a second rate which is made to be a preselected fraction of said first rate, and means for measuring the temperature of the vapors produced in said still.

18. Apparatus for analyzing a stream of liquid, comprising a heated still for vaporizing at least a portion of the liquid fed thereto, a condenser at one end of said still for condensing a portion of the vapors produced in said still, means for feeding at a first predetermined rate to said still the liquid stream to be analyzed, a packed column, means for feeding liquid condensate produced by said condenser into said column, said last-mentioned feeding means having incorporated therein cooling means for cooling the condensate prior to its entry into said column; means for feeding vapors produced in said still into said column, to therein come into contact with said liquid condensate, said last-mentioned feeding means having incorporated therein cooling means for cooling the vapors prior to their entry into said column; means for extracting liquid from said column at a second rate which is made to be a preselected fraction of said first rate, and means for measuring the temperature of the vapors produced in said still.

19. Apparatus for analyzing a stream of liquid, comprising a heated still for vaporizing at least a portion of the liquid fed thereto, a condenser at one end of said still for condensing a portion of the vapors produced in said still, means for feeding at a first predetermined rate to said still the liquid stream to be analyzed, a packed column, means for feeding liquid condensate produced by said condenser into said column so that said condensate flows in one direction through said column, said last-mentioned feeding means having incorporated therein cooling means for cooling the condensate prior to its entry into said column; means for feeding vapors produced in said still into said column so that said vapors tend to pass through said column in a direction opposite to said one direction, said last-mentioned feeding means having incorporated therein cooling means for cooling the vapors prior to their entry into said column; means for extracting liquid from said column at a second rate which is made to be a preselected fraction of said first rate, and means for measuring the temperature of the vapors produced in said still.

20. Apparatus for continuously analyzing a stream of liquid, comprising a heated still for vaporizing at least a portion of the liquid fed thereto, a cooling water jacket at one end of said still operating to condense a portion of the vapors produced in said still, means for continuously feeding at a first predetermined rate to said still the liquid stream to be analyzed, a packed column, means for feeding liquid condensate produced by means of said jacket into said column so that said condensate flows in one direction through said column, said last-mentioned feeding means having incorporated therein cooling means for cooling the condensate prior to its entry into said column; means for feeding vapors produced in said still into said column so that said vapors tend to pass through said column in a direction opposite to said one direction, said last-mentioned feeding means having incorporated therein cooling means for cooling the vapors prior to their entry into said column; means for continuously extracting liquid from said column at a second rate which is made to be a preselected fraction of said first rate, means coupled to said still for draining off excess liquid which tends to accumulate therein, and means for continuously measuring the temperature of the vapors produced in said still.

References Cited by the Examiner

UNITED STATES PATENTS 3,081,619   3/63   Pappas _____ 73—17

RICHARD C. QUEISSER, *Primary Examiner.*

DAVID SCHONBERG, *Examiner.*